(12) United States Patent
Aieta (10) Patent No.: US 10,613,376 B2
(45) Date of Patent: Apr. 7, 2020

(54) AUGMENTED REALITY SEE-THROUGH DISPLAY

(71) Applicant: Hewlett Packard Enterprise Development LP, Houston, TX (US)

(72) Inventor: Francesco Aieta, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/068,798

(22) PCT Filed: Jan. 28, 2016

(86) PCT No.: PCT/US2016/015269
§ 371 (c)(1),
(2) Date: Jul. 9, 2018

(87) PCT Pub. No.: WO2017/131685
PCT Pub. Date: Aug. 3, 2017

(65) Prior Publication Data
US 2019/0025645 A1    Jan. 24, 2019

(51) Int. Cl.
*G06T 19/00*    (2011.01)
*G02F 1/1335*    (2006.01)
(Continued)

(52) U.S. Cl.
CPC ..... *G02F 1/133602* (2013.01); *G02B 6/0035* (2013.01); *G02B 27/0172* (2013.01);
(Continued)

(58) Field of Classification Search
None
See application file for complete search history.

(56) References Cited

U.S. PATENT DOCUMENTS 5,589,956 A * 12/1996 Morishima .............. G02B 5/32
345/7
7,714,368 B2    5/2010 Yang et al.
(Continued)

FOREIGN PATENT DOCUMENTS

| KR | 10-2015-0023712 | 3/2015 |
| WO | 2015/016844 A1 | 2/2015 |
| WO | WO-2015-095737 | 6/2015 |

OTHER PUBLICATIONS

Levola, T.; "Diffractive Optics for Virtual Reality Displays"; (Research Paper), Proceedings for Journal of the Society for Information Display, pp. 467-475, vol. 14, No. 5, 2 pages, available at http://onlinelibrary.wiley.com/doi/10.1889/1.2206112/abstract.
(Continued)

*Primary Examiner* — Andrew G Yang
(74) *Attorney, Agent, or Firm* — Hewlett Packard Enterprise Patent Department (57) ABSTRACT

Examples disclosed herein include an augmented reality (AR) see-through display system, which includes a diffractive backlight substrate including diffractive gratings. The display system includes a light source to transmit light into the backlight substrate, wherein the diffractive gratings scatter the light out of the backlight substrate to form an array of directional pixels. The display system includes an LCD panel to modulate the array of directional pixels to form an image that augments a real world view visible through the backlight substrate and the LCD panel.

13 Claims, 5 Drawing Sheets

(51) Int. Cl.
*F21V 8/00* (2006.01)
*G02B 27/01* (2006.01)
*G06K 9/00* (2006.01)

(52) U.S. Cl.
CPC ... *G02F 1/133504* (2013.01); *G06K 9/00671* (2013.01); *G06T 19/006* (2013.01); *G02B 6/0036* (2013.01); *G02B 2027/0178* (2013.01); *G02F 1/133615* (2013.01)

(56) References Cited

U.S. PATENT DOCUMENTS

| | | | |
|---|---|---|---|
| 8,773,599 B2 | 7/2014 | Saeedi et al. | |
| 9,019,615 B2 | 4/2015 | Travis | |
| 9,097,890 B2 | 8/2015 | Miller et al. | |
| 2013/0100362 A1 | 4/2013 | Saeedi et al. | |
| 2013/0335821 A1* | 12/2013 | Robinson | G02B 6/0023 359/464 |
| 2014/0098010 A1 | 4/2014 | Travis | |
| 2014/0118829 A1 | 5/2014 | Ma et al. | |
| 2014/0126183 A1* | 5/2014 | Geng | G02B 5/045 362/97.1 |
| 2014/0300840 A1 | 10/2014 | Fattal et al. | |
| 2014/0300947 A1 | 10/2014 | Fattal et al. | |
| 2016/0231570 A1* | 8/2016 | Levola | G02B 27/0172 |
| 2017/0102543 A1* | 4/2017 | Vallius | G02B 27/0172 |
| 2017/0184848 A1* | 6/2017 | Vallius | G02B 3/14 |

OTHER PUBLICATIONS

Maimone et al., "Pinlight Displays: Wide Field of View Augmented Reality Eyeglasses using Defocused Point Light Sources", ACM Transactions on Graphics, vol. 33, No. 4, Article 89, 2014, 11 pages.
Lumus, "The Future is Looking Up", available online at <https://web.archive.org/web/20180530013214/https://lumusvision.com/>, May 30, 2018, 5 pages.
International Search Report and Written Opinion received for PCT Patent Application No. PCT/US2016/015269, dated Oct. 21, 2016, 10 pages.
Erickson, "GLASS", Available online at <https://web.archive.org/web/20180427035434/https://x.company/glass/>, Apr. 27, 2018, 9 pages.
Cheng et al., "Design of a wide-angle, lightweight head-mounted display using free-form optics tiling", Optics Letters, vol. 36, No. 11, 2011, pp. 2098-2100.

* cited by examiner

AUGMENTED REALITY SEE-THROUGH DISPLAY

BACKGROUND

Augmented reality (AR) is a live view of a physical, real-world environment, which is augmented with computer-generated information, such as still images or video images. AR systems have the potential to revolutionize industrial services such as selecting parts in a warehouse, sending repair instructions in real time to workers, or virtual training and safety procedures. To enable this, technological hurdles need to be addressed such as increasing the quality and size of the display that the wearer sees, and extending battery life.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Despite the promising applications, augmented reality (AR) technology still presents many practical limitations that have prevented or limited its use. Advances in many disciplines may enable features like low-latency rendering, tracking, application development, localization, and networking. One barrier for AR technology is represented by the displays. The characteristics of an AR display can be very different depending on the application. For example, while for military use, high image quality may be a priority, for commercial devices, an industrial design, cost, and size may be more of a priority.

Focusing on the optical aspect of AR displays, the main features common to almost every application include the following: (1) large field-of-view (FOV); (2) high resolution; and (3) small foot-print. An object or information overlaying the real world may appear anywhere in a viewer's field of view as the viewer moves. A FOV smaller than the viewer's total field of view would cause objects to be cropped or disappear, thereby diminishing the effectiveness of the AR. According to the standard measure for "normal" vision, the human eye is able to resolve a contrasting intensity cycle spanning two arc minutes (2/60 degree). With the assumption that a contrasting cycle can be represented by two adjacent pixels, a near-eye display supporting a field of view of 100 deg×100 deg would be expected to provide a resolution of approximately 6000×6000 to 12000×12000 pixels to match the limits of the visual system described above. Finally, to provide a comfortable immersive reality experience, the user should not feel the presence of the device as the user conducts other tasks. This involves a light and small-footprint design.

Examples disclosed herein provide a practical design with both a large FOV and comfortable form factor in a single AR device. Examples disclosed herein eliminate many of the optical components present in prior designs and instead rely on computation to achieve some of the image formation process. Instead of using refractive or reflective components, a liquid crystal display (LCD) panel and a sparse array of point light sources are implemented to create the AR display. The defocused point sources are coded through a transmissive LCD panel to form miniature, imperceptible projectors. These miniature projectors direct light into the cornea of the eye, allowing their small image areas to be tiled to create an arbitrarily wide FOV. Software decomposes the target image into a series of tiled sub-images that correspond to miniature projectors with a virtual aperture.

If the point sources for the mini projectors are created by etching holes in a waveguide edge illuminated with light emitting diodes (LEDs), the size of the holes and the geometry of the elements may limit the freedom of design parameters, creating a tradeoff between large FOV, angular resolution and form factors. The divergence of the light scattered by the apertures may not be controlled, so some of the light may be lost, limiting the brightness of the display. Another source of low efficiency is given by the light that escapes the waveguide edges, and the limited transparency of some LCDs.

One example is directed to a wide field of view see-through display for augmented reality based on a pinhole camera architecture. Being based on a pinhole camera concept, this architecture eliminates the use of bulky optics, and offers compact form factor. Using guided-wave illumination, a substantially transparent substrate patterned with diffractive gratings creates an array of directional pixels. Each ray is then modulated by a substantially transparent LCD panel. The design flexibility provided by the gratings and an image-tiling technique, provide the ability to create augmented images with large field of view and good resolution overlapped to the real world vision.

Figure 1:
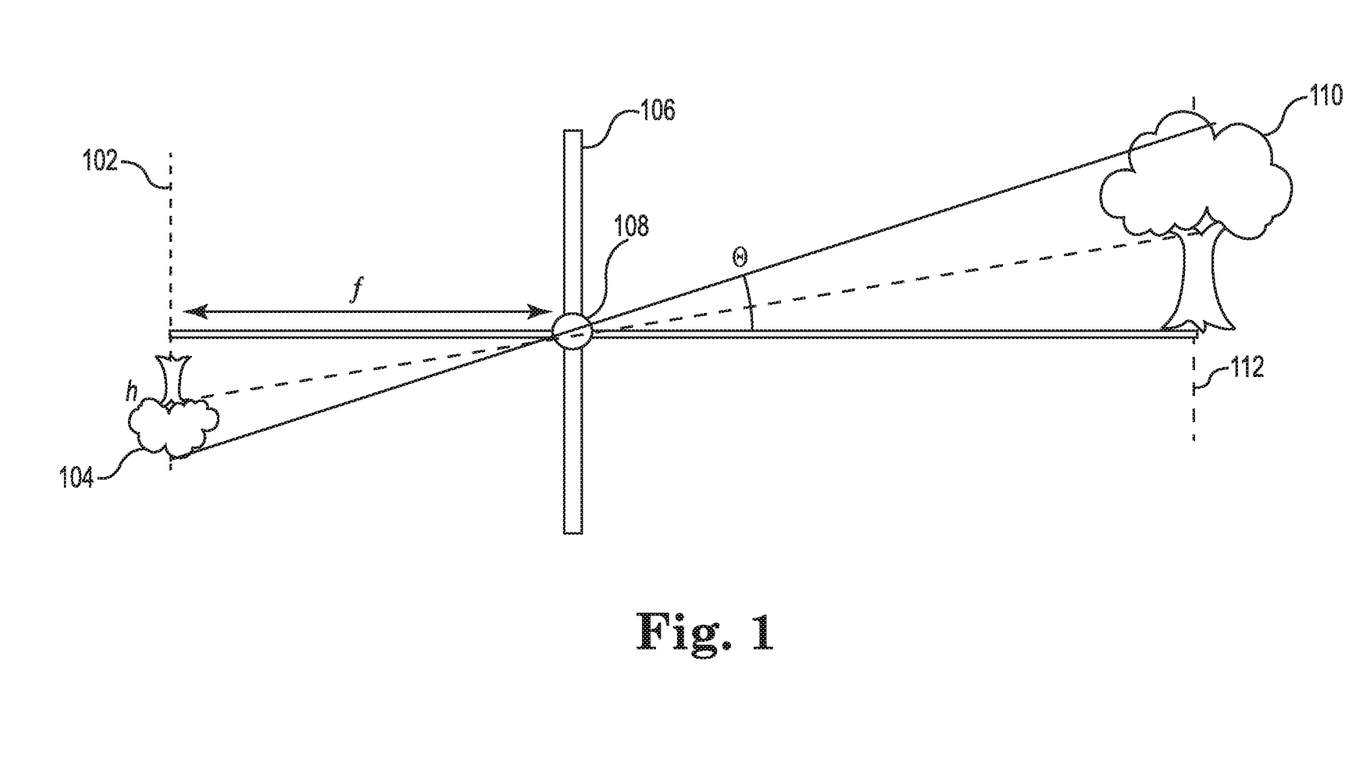
FIG. 1 is a diagram illustrating the concept of image formation using a pinhole camera.

FIG. 1 is a diagram illustrating the concept of image formation using a pinhole camera. As shown in FIG. 1, light rays from a real world object 110 in an object plane 112 pass through a small hole (pinhole) 108 of a substrate 106 to form an inverted image 104 of the object 110 in an image plane 102. The pinhole 108 acts as the lens, and forces every point emitting light in the scene to form a small point on the image plane 102, so the image is on focus. Examples disclosed herein are based on this pinhole camera concept. In FIG. 1, h is the size of the image object 104; f is the distance between the image plane 102 and the substrate 106; and Θ is the FOV. These are described in further detail below.

Figure 2:
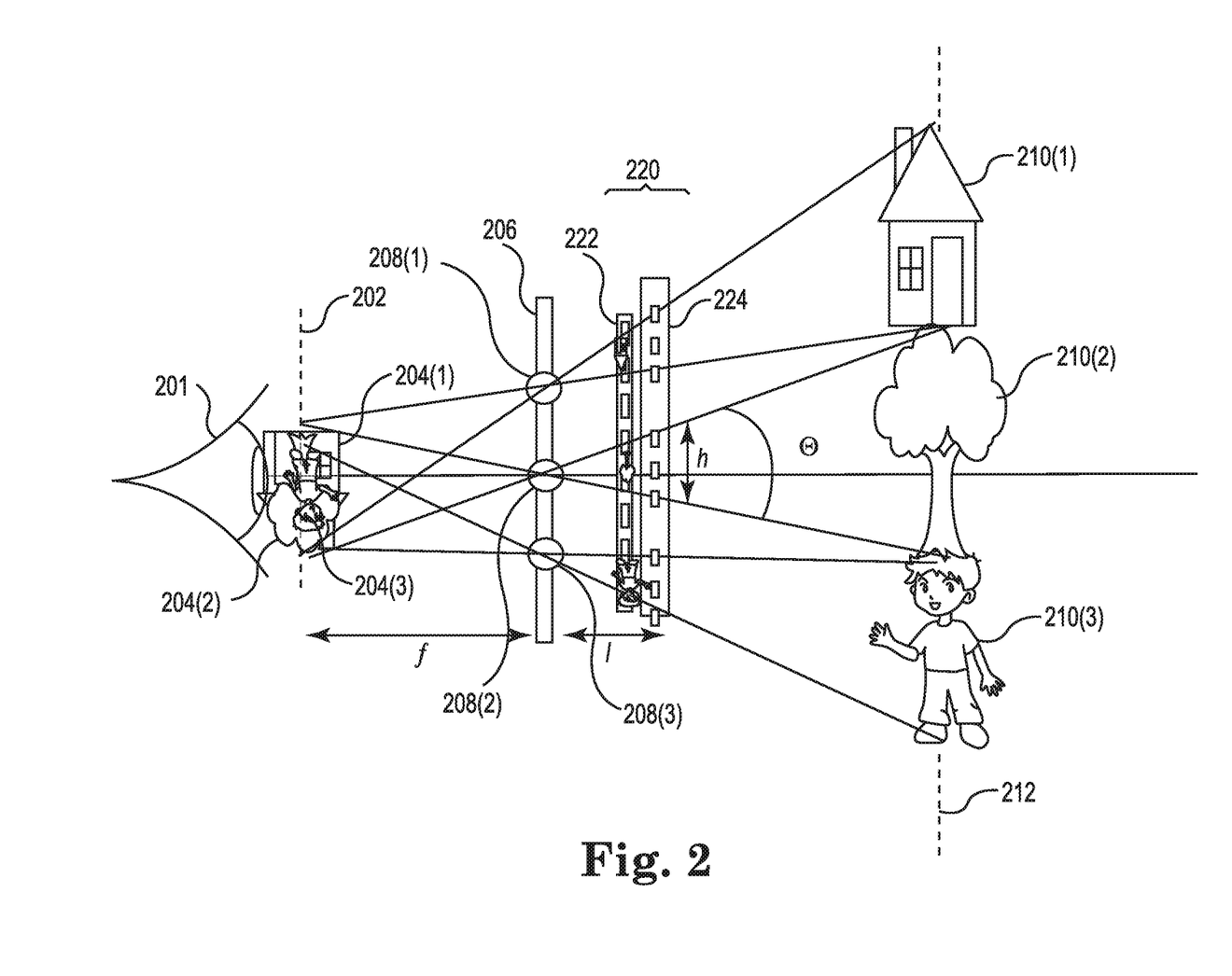
FIG. 2 is a diagram illustrating an augmented reality see-through display system according to one example.

FIG. 2 is a diagram illustrating an augmented reality see-through display system 220 according to one example. The display system 220 includes a substantially transparent multidirectional, diffractive backlight substrate 224, and a substantially transparent LCD panel 222, both of which are placed directly in front of a user's eye 201. The operation of display system 220 will be described below with further reference to FIG. 3.

Figure 3:
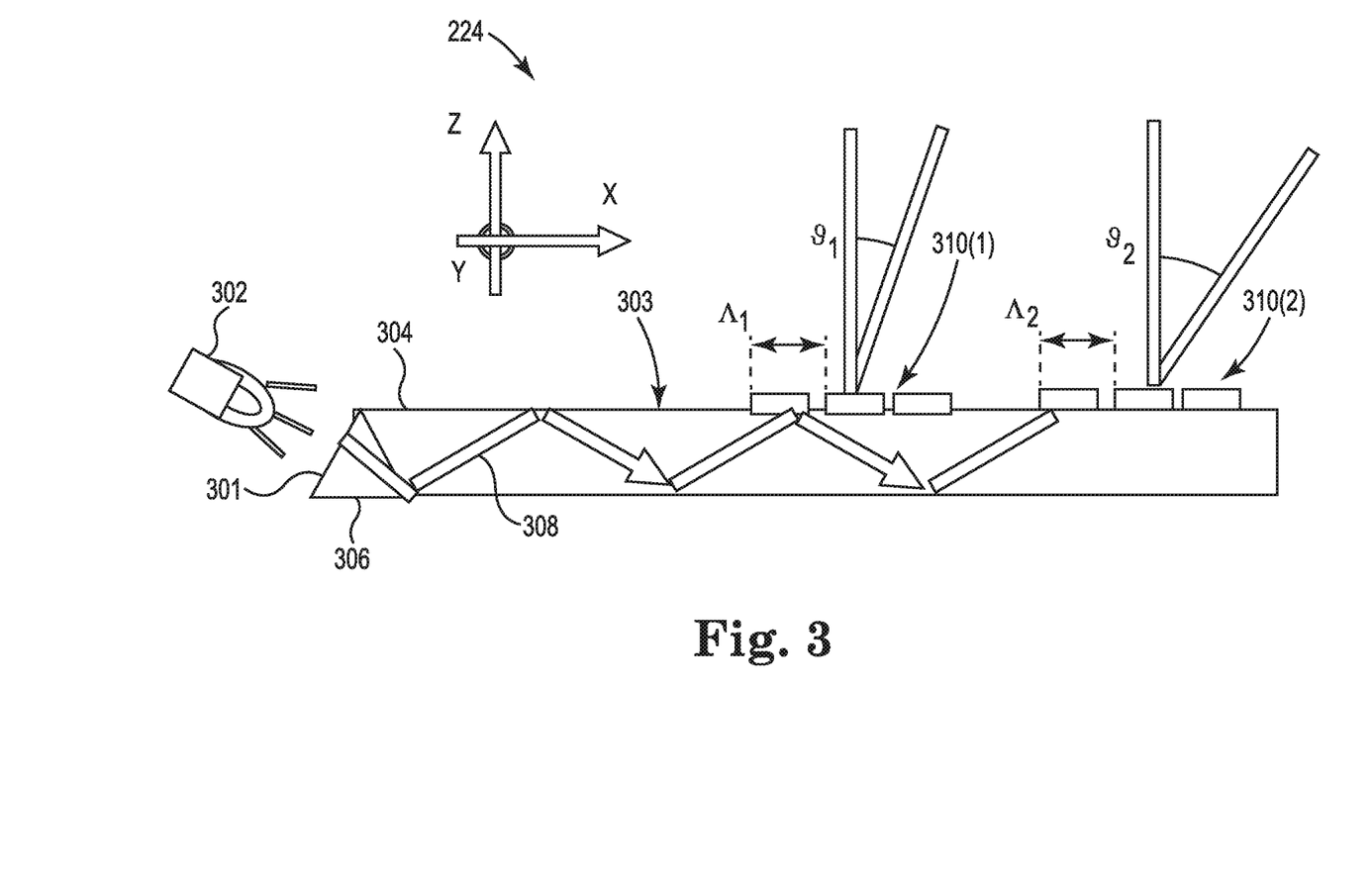
FIG. 3 is a diagram illustrating a side view of the diffractive backlight substrate shown in FIG. 2 according to one example.

FIG. 3 is a diagram illustrating a side view of the diffractive backlight substrate 224 shown in FIG. 2 according to one example. The diffractive backlight substrate 224 includes at least one light emitting diode (LED) 302, and a multidirectional pixel backplane 303. The backplane 303 includes a plurality of sets of directional diffractive pixel gratings 310(1) and 310(2) (collectively referred to as diffractive gratings 310), which are arranged in a two-dimensional array on a top surface 304 of the backplane 303. Each set of diffractive gratings 310 produces a directional diffractive pixel. The light from the at least one LED 302 enters the backplane 303 from a non-vertical angled edge 301 of the backplane 303, and is then guided by total internal reflection by the top surface 304 and the bottom surface 306 of the backplane 303, as indicated by light ray 308. The light in the backplane 303 is then scattered by the array of diffractive gratings 310 out of the top surface 304 of the backplane 303 and towards the user's eye 201 (FIG. 2), thereby simulating the light transmitted through a pinhole. The simulation is represented in FIG. 2 by light rays passing through pinholes 208(1)-208(3) of an imaginary substrate 206. As shown in FIG. 2, light rays from real world objects 210(1)-210(3) in an object plane 212 pass through pinholes 208(1)-208(3) to form inverted images 204(1)-204(3) of the objects in image plane 202. In FIG. 2, f is the distance between the image plane 202 and the substrate 206; l is the distance between the substrate 206 and the diffractive backlight substrate 224; h is the height of the object images 204; and Θ is the FOV.

For the diffractive backlight substrate 224, the light input planar momentum, $k_{in}$, is given by the following Equation I:

$$k_{in}=(n_{eff},0,0)2\pi/\lambda \qquad \text{Equation I}$$

The gratings 310 can be designed so that, as a result of first order diffraction, the light input planar momentum is scattered in a well-defined direction characterized by the normalized output vector, $k_{out}$, given in the following Equation II:

$$k_{out}=(n_x,n_y,n_z)2\pi/\lambda \qquad \text{Equation II}$$

Equations for $n_x$, $n_y$, and $n_z$ are given in the following Equation III:

$$n_x = n_{eff} - \frac{\lambda}{\Lambda\cos\phi}, \; n_y = -\frac{\lambda}{\Lambda\sin\phi}, \; n_z^2 = 1 - n_x^2 - n_y^2 \qquad \text{Equation III}$$

Where:
$n_{eff}$=the effective index of propagation of the input light along the x axis;
Λ=the grating pitch; and
φ=the groove orientation with respect to the y axis.

Thus, the diffractive gratings 310 can be designed to provide a desired angle at which light escapes. In FIG. 3, diffractive gratings 310(1) have a grating pitch of $\Lambda_1$ and produce an angle of $\vartheta_1$, and gratings 310(2) have a different grating pitch of $\Lambda_2$ and produce a different angle of $\vartheta_2$. From Equation III, it follows that the direction of the light scattered by a pixel with a given geometry depends on the wavelength. However, a design for a multi-color display (e.g., RGB) can be made by introducing spatial multiplexing of three pixel sets that can be selectively addressed by changing the illumination angle (at the cost of a reduced resolution). Note that to generate an image on the LCD panel 222 that can reproduce the tiled FOV, some computations may be performed.

Each pixel of the LCD panel 222 receives the light from one ray, modulates the received light, and then the modulated light continues on toward the user's eye 201. The lens of the eye 201 redirects the light onto the image plane (i.e., retina plane), which is represented in FIG. 2 by plane 202, where the image appears on focus.

Resolution is a direct tradeoff with FOV, as indicated by the following Equation IV:

$$H=f\tan\Theta \qquad \text{Equation IV}$$

Where:
H=the size of the image source;
f=the distance between the image plane 202 and the substrate 206; and
Θ=the FOV, or the apparent size of the virtual image in space (which is desired to be large).

However, if H is the pixel size, then Θ is the resolution or apparent size of the pixel in image space (which is desired to be small). In order to have an acceptable angular resolution, a single pinhole projector does not alone provide a useful FOV for most applications. However, multiple pinhole projectors may be tiled to significantly increase the FOV. To maintain a comfortable small factor for a pair of glasses, the distance of the light source from the eye should be between 3 and 6 cm. The approach described here solves this constraint. The flexibility offered by diffractive directional pixels allows them to be placed very close to the LCD panel 222, with a minimum volume occupied by the optics, and at the same time, to simulate the light coming from the desired direction and distance.

In the following, it will be shown how examples disclosed herein can be implemented to achieve a large FOV and a small form factor. FIG. 2 shows one dimension of the FOV, but the techniques can be easily extended to two dimensions for a complete horizontal and vertical field of view. A total FOV=100 deg, is divided into five sub-views (Θ=20 deg) corresponding to five different pinhole projections that, once properly tiled together, will create a continuous view. The spatial resolution is fixed to be 5 pixels/degree ($\Theta_r$=0.2 deg) and the wavelength λ=500 nm. Diffraction of the light sets the minimum width for each pixel to provide an angular spread less than the resolution. The width is given by the following Equation V:

$$w=\lambda/\Theta_r \qquad \text{Equation V}$$

Where:
w is the width of each pixel;
λ is the wavelength of the light; and
$\Theta_r$ is the spatial resolution.

The number of pixels for each sub-view, N, and the space occupied, h, are given in the following Equations VI and VII:

$$N=\Theta/\Theta_r=100 \qquad \text{Equation VI}$$

$$h=Nw=1.43 \text{ cm} \qquad \text{Equation VII}$$

Assuming a diameter of the pupil of 3 mm, the distances f and l can be calculated and their sum gives the distance from the eye at which the display should be: f+l=4.8 cm. This distance gives enough space for the user to wear eyeglasses and at the same time maintain small form factor. The actual thickness of the device 220 (LCD panel 222+ diffractive backlight substrate 224) is less than 1 cm.

Figure 4:
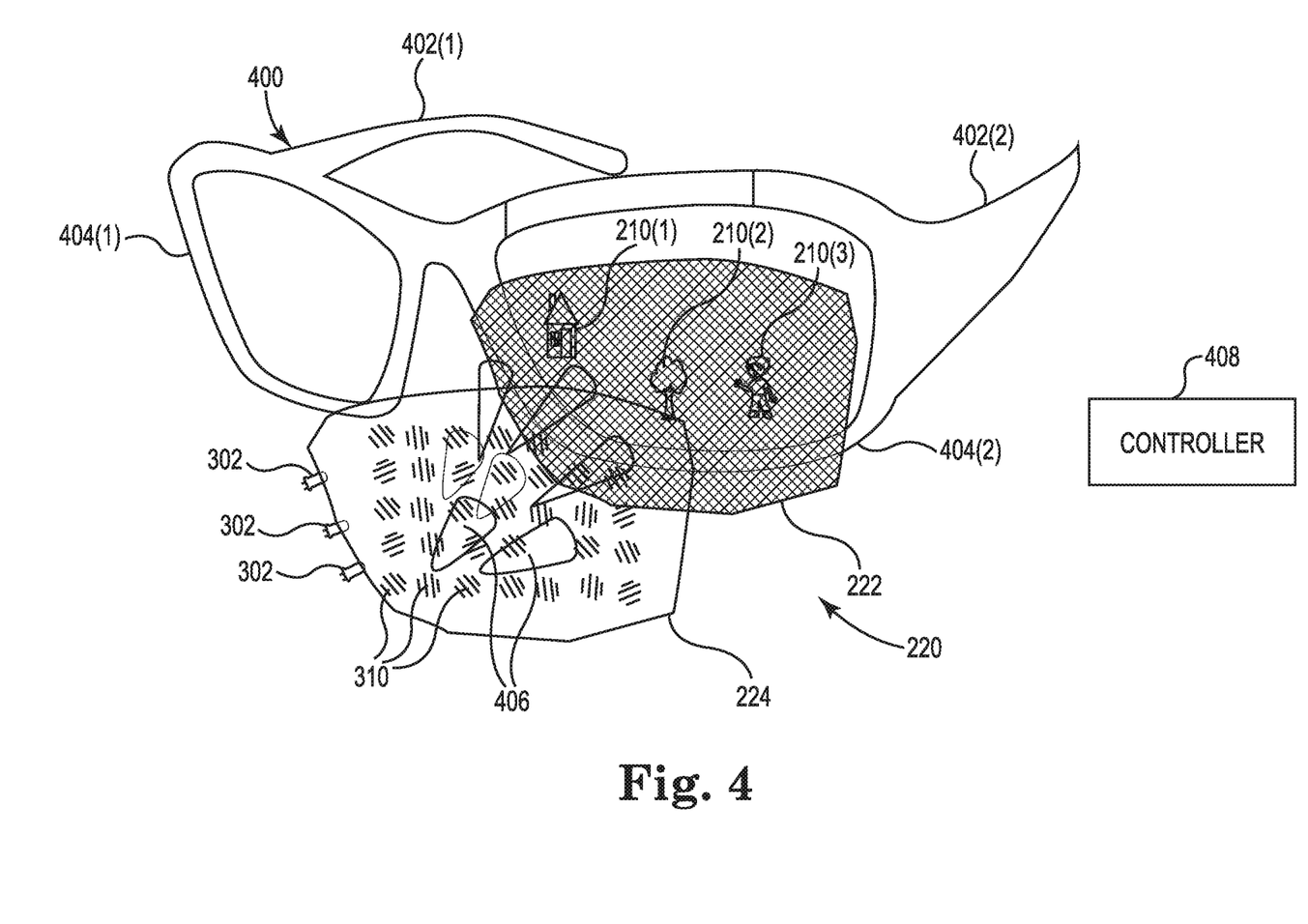
FIG. 4 is a diagram illustrating an augmented reality see-through display system implemented in an eyeglass frame according to one example.

FIG. 4 is a diagram illustrating an augmented reality see-through display system 220 implemented in an eyeglass frame 400 according to one example. The eyeglass frame 400 includes temples 402(1) and 402(2) (collectively referred to as temples 402) for securing the frame 400 over the ears of a user, and optics supporting rims 404(1) and 404(2) (collectively referred to as rims 404). In the illustrated example, the display system 220 is implemented in the rim 404(2). The rims 404 each define an opening, and the display system 220 complete covers the opening defined by rim 404(2). In other examples, a second display system 220 may be similarly implemented in rim 404(1). Rims 404(1) and 404(2) may also hold standard eyeglass lenses.

The display system 220 includes LCD panel 222 and diffractive backlight substrate 224, which are shown in an assembly view outside of the rim 404(2). When assembled, LCD panel 222 is supported by rim 404(2) (nearest the user's eye), and diffractive backlight substrate 224 is supported by rim 404(2) and is positioned over the LCD panel 222 (farther from the user's eye). In the illustrated example, the LCD panel 222 and the diffractive backlight substrate 224 each have the same shape as a standard eyeglass lens.

As shown in FIG. 4, each diffractive grating set 310 of the diffractive backlight substrate 224 acts as a miniature projector that projects a cone of light 406 onto the LCD panel 222. LCD panel 222 modulates the received light to produce images that overlay and augment the real-world view of the user seen through the rims 404.

In the illustrated example, the display system 220 includes a controller 408 for controlling the operation of the LCD panel 222 and the diffractive backlight substrate 224 to produce a still image or video image that augments a user's view of a real world scene, such as real world objects 210(1)-210(3). The controller 408 may be implemented, for example, on one of the temples 402. Controller 408 may be implemented as software modules, hardware modules, special-purpose hardware (e.g., application specific hardware, application specific integrated circuits (ASICs), embedded controllers, hardwired circuitry, etc.), or some combination of these.

In some examples, the diffractive backlight substrate 224 is made of glass, and in addition to being substantially (e.g., completely) transparent (for the see-through function), the substrate 224 can be fabricated in large scale in one step of photolithography or nanoimprinting. The emission of the backlight substrate 224 is collimated and directional, so the use of the light source is optimized, improving energy efficiency compared to other designs. In some examples, the LCD panel 222 is a commercial transmissive LCD display (e.g., Sony LCX017). The near-eye glasses architecture disclosed herein eliminates bulky optics of other designs, decreasing the weight and footprint of the device. At the same time, examples disclosed herein can achieve large field of view and good resolution.

One example of the present disclosure is directed to an augmented reality (AR) see-through display system, which includes a diffractive backlight substrate including diffractive gratings. The display system includes a light source to transmit light into the backlight substrate, wherein the diffractive gratings scatter the light out of the backlight substrate to form an array of directional pixels. The display system includes an LCD panel to modulate the array of directional pixels to form an image that augments a real world view visible through the backlight substrate and the LCD panel.

The backlight substrate and the LCD panel may be substantially transparent. The light source may include at least one light emitting diode (LED) that transmits the light into an edge of the backlight substrate, and the light transmitted into an edge of the backlight substrate may be guided by total internal reflection by a top surface and bottom surface of the backlight substrate. The AR display system may have a thickness of less than 1 cm. The backlight substrate may be made of glass. The AR display system may be implemented in an eyeglass frame, and the backlight substrate and the LCD panel may completely cover at least one rim of the eyeglass frame. The AR display system may include a controller to control operation of the LCD panel.

Another example of the present disclosure is directed to an augmented reality (AR) see-through display system, which includes an eyeglass frame including a pair of rims that define a pair of openings through which a user can view a real world scene. The AR display system includes a substantially transparent LCD panel positioned over a first one of the openings to modulate an array of directional pixels to form an image that augments the real world scene. The AR display system includes a substantially transparent diffractive backlight substrate positioned over the LCD panel to scatter via diffractive gratings light provided by a light source to produce the array of directional pixels.

The light provided by the light source may be transmitted into an edge of the backlight substrate, and guided by total internal reflection by a top surface and bottom surface of the backlight substrate. The LCD panel and the backlight substrate may have a total thickness of less than 1 cm.

Figure 5:
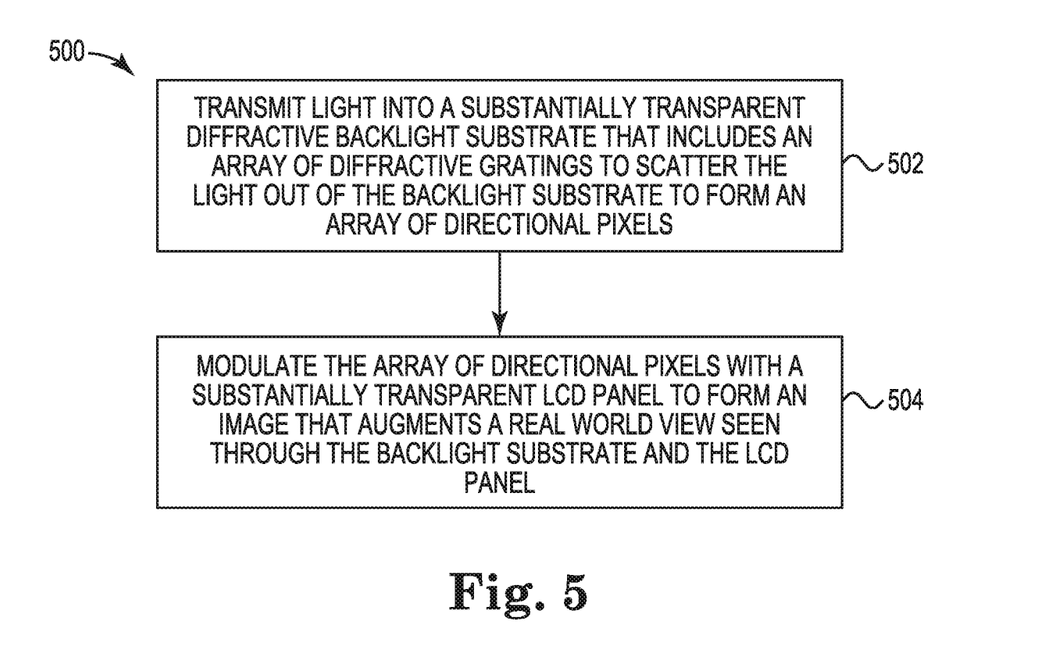
FIG. 5 is a flow diagram illustrating a method of providing an augmented reality view according to one example.

Yet another example of the present disclosure is directed to a method of providing an augmented reality (AR) view. FIG. 5 is a flow diagram illustrating a method 500 of providing an augmented reality (AR) view according to one example. At 502 in method 500, light is transmitted into a substantially transparent diffractive backlight substrate that includes an array of diffractive gratings to scatter the light out of the backlight substrate to form an array of directional pixels. At 504, the array of directional pixels is modulated with a substantially transparent LCD panel to form an image that augments a real world view seen through the backlight substrate and the LCD panel.

The method 500 may further include directing the image from the LCD panel through a rim of an eyeglass frame. The light transmitted into the diffractive backlight in method 500 may be transmitted into a non-vertical angled edge of the diffractive backlight and guided by total internal reflection by a top surface and bottom surface of the backlight substrate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An augmented reality (AR) see-through display system, comprising:
   a diffractive backlight substrate including diffractive gratings and at least one light emitting diode, the at least one light emitting diode to transmit light into the diffractive backlight substrate, wherein the at least one light emitting diode transmits the light into an edge of the diffractive backlight substrate, the edge of the diffractive backlight substrate extending at a non-perpendicular angle relative to both front and rear surfaces of the diffractive backlight substrate, and wherein the diffractive gratings scatter the light out of the diffractive backlight substrate to form an array of directional pixels; and an LCD panel to receive the light scattered by the diffractive gratings and modulate the array of directional pixels to form an image that augments a real world view visible through the backlight substrate and the LCD panel.

2. The AR display system of claim 1, wherein the backlight substrate and the LCD panel are substantially transparent.

3. The AR display system of claim 1, wherein the light transmitted into the edge of the backlight substrate is guided by total internal reflection by a top surface and bottom surface of the backlight substrate.

4. The AR display system of claim 1, wherein the AR display system has a thickness of less than 1 cm.

5. The AR display system of claim 1, wherein the backlight substrate is made of glass.

6. The AR display system of claim 1, wherein the AR display system is implemented in an eyeglass frame.

7. The AR display system of claim 6, wherein the backlight substrate and the LCD panel completely cover at least one rim of the eyeglass frame.

8. The AR display system of claim 1, and further comprising a controller to control operation of the LCD panel.

9. An augmented reality (AR) see-through display system, comprising:

an eyeglass frame including a pair of rims that define a pair of openings through which a user can view a real world scene;

a substantially transparent LCD panel positioned over a first one of the openings to modulate an array of directional pixels to form an image that augments the real world scene; and a substantially transparent diffractive backlight substrate including at least one light emitting diode and positioned over the LCD panel to scatter via diffractive gratings light provided by the at least one light emitting diode to produce the array of directional pixels, wherein the substantially transparent LCD panel is configured to receive the light scattered by the diffractive gratings, wherein the light provided by the at least one light emitting diode is transmitted into an edge of the diffractive backlight substrate, and guided by total internal reflection by a top surface and bottom surface of the diffractive backlight substrate, the edge of the diffractive backlight substrate extending at a non-perpendicular angle relative to both front and rear surfaces of the diffractive backlight substrate.

10. The AR display system of claim 9, wherein the LCD panel and the backlight substrate have a total thickness of less than 1 cm.

11. A method of providing an augmented reality (AR) view, comprising:

transmitting light from at least one light emitting diode into an edge of a substantially transparent diffractive backlight substrate that includes the at least one light emitting diode and an array of diffractive gratings to scatter the light out of the backlight substrate to form an array of directional pixels, wherein the edge of the diffractive backlight substrate extends at a non-perpendicular angle relative to both front and rear surfaces of the diffractive backlight substrate;

receiving the light scattered by the array of diffractive gratings with a substantially transparent LCD panel; and modulating the array of directional pixels with the substantially transparent LCD panel to form an image that augments a real world view seen through the backlight substrate and the LCD panel.

12. The method of claim 11, and further comprising:

directing the image from the LCD panel through a rim of an eyeglass frame.

13. The method of claim 11, wherein the light transmitted into the diffractive backlight is transmitted into a non-vertical angled edge of the diffractive backlight and guided by total internal reflection by a top surface and bottom surface of the backlight substrate.

* * * * *